(12) United States Patent
Kallhoff et al.

(10) Patent No.: US 10,281,364 B1
(45) Date of Patent: May 7, 2019

(54) SYSTEM AND METHOD FOR USING ENGINE EFFICIENCY IN PREDICTIVE MAINTENANCE OF A POWER GENERATOR

(71) Applicant: Cummins Power Generation IP, Inc., Minneapolis, MN (US)

(72) Inventors: Dustin Wayne Kallhoff, Maple Grove, MN (US); Benjamin S. Fuchs, Andover, MN (US)

(73) Assignee: Cummins Power Generation IP, Inc., Minneapolis, MN (US)

(*) Notice: Subject to any disclaimer, the term of this patent is extended or adjusted under 35 U.S.C. 154(b) by 347 days.

(21) Appl. No.: 15/066,648

(22) Filed: Mar. 10, 2016

Related U.S. Application Data

(60) Provisional application No. 62/131,617, filed on Mar. 11, 2015.

(51) Int. Cl.
*G01M 99/00* (2011.01)

(52) U.S. Cl.
CPC .................. *G01M 99/008* (2013.01)

(58) Field of Classification Search
CPC .................................................. G01M 99/008
See application file for complete search history.

(56) References Cited

U.S. PATENT DOCUMENTS

| | | | | |
|---|---|---|---|---|
| 5,559,704 A | * | 9/1996 | Vanek | B60L 11/02 290/1 R |
| 2010/0123439 A1 | * | 5/2010 | Steele, Jr. | H02P 9/305 322/24 |
| 2015/0175149 A1 | * | 6/2015 | Zhao | B60W 20/00 701/22 |

\* cited by examiner

*Primary Examiner* — Mamadou L Diallo
(74) *Attorney, Agent, or Firm* — Foley & Lardner LLP

(57) ABSTRACT

Methods, systems and apparatuses for early fault detection of a power generator are provided. An alternator output power parameter is received and a fuel flow input measurement is received. An estimated engine efficiency value is determined in response to the alternator output power parameter and the fuel flow input measurement. The estimated engine efficiency value may be transmitted to a monitoring device.

25 Claims, 3 Drawing Sheets

300

SYSTEM AND METHOD FOR USING ENGINE EFFICIENCY IN PREDICTIVE MAINTENANCE OF A POWER GENERATOR

CROSS-REFERENCE TO RELATED APPLICATIONS

This application claims priority to and benefit of U.S. Provisional Patent Application No. 62/131,617, filed Mar. 11, 2015 and entitled "System and Methods for Using Engine Efficiency in Predictive Maintenance of a Power Generator," the entire disclosure of which is incorporated herein by reference.

FEDERAL FUNDING STATEMENT

This invention was made with government support under Contract No. DE-EE0003392 awarded by the U.S. Department of Energy. The U.S. Government has certain rights in this invention.

TECHNICAL FIELD

The present disclosure relates to systems and methods for early fault detection of a power generator.

BACKGROUND

Power generators (also referred to herein as generator sets or "gensets") are used for a variety of purposes. Typically, power generators utilize a fuel to produce electrical power. Examples include, but are not limited to, compression ignition (such as diesel, homogenous charge compression ignition (HCCI), etc.) or spark ignited internal combustion engine based systems that drive an electric generator to produce electrical power. The generated electrical power may be used in a variety of applications. These applications can range from residential to commercial, including both portable and stationary uses, standby/backup power, and the like.

The engine efficiency of a power generator affects the total cost of ownership of a power generator. Diagnosing failure within the power generator and initiating preemptive early repair can save overall maintenance costs of the power generator and enhance total cost of ownership.

SUMMARY

In a first set of embodiments, a method of early fault detection of a power generator comprises receiving alternator output power parameters and fuel flow input measurements. An estimated engine efficiency value of the power generator is determined in response to the alternator electrical parameters and the fuel flow input measurements. The estimated engine efficiency value may be transmitted to a monitoring device.

In another set of embodiments, a power generation system comprises a power generator and a processor. The processor is configured to receive an alternator output power parameter of an alternator of the power generator. A fuel flow input measurement of a fuel provided to the power generator is also received by the processor. An estimated engine efficiency value of the power generator is determined by the processor in response to the alternator output power parameter and the fuel flow input measurement. The estimated engine efficiency value may be transmitted to a monitoring device.

In still another set of embodiments, an apparatus for early fault detection of a power generator comprises a communication circuit for receiving alternator output power parameters and fuel flow input measurements. The apparatus also comprises a processing circuit for determining an estimated engine efficiency value of the power generator in response to the alternator output power parameters and the fuel flow input measurements. The estimated engine efficiency value may be transmitted by a diagnostic circuit to a monitoring device.

These and other features, together with the organization and manner of operation thereof, will become apparent from the following detailed description when taken in conjunction with the accompanying drawings.

DETAILED DESCRIPTION OF VARIOUS EMBODIMENTS

Figure 1:
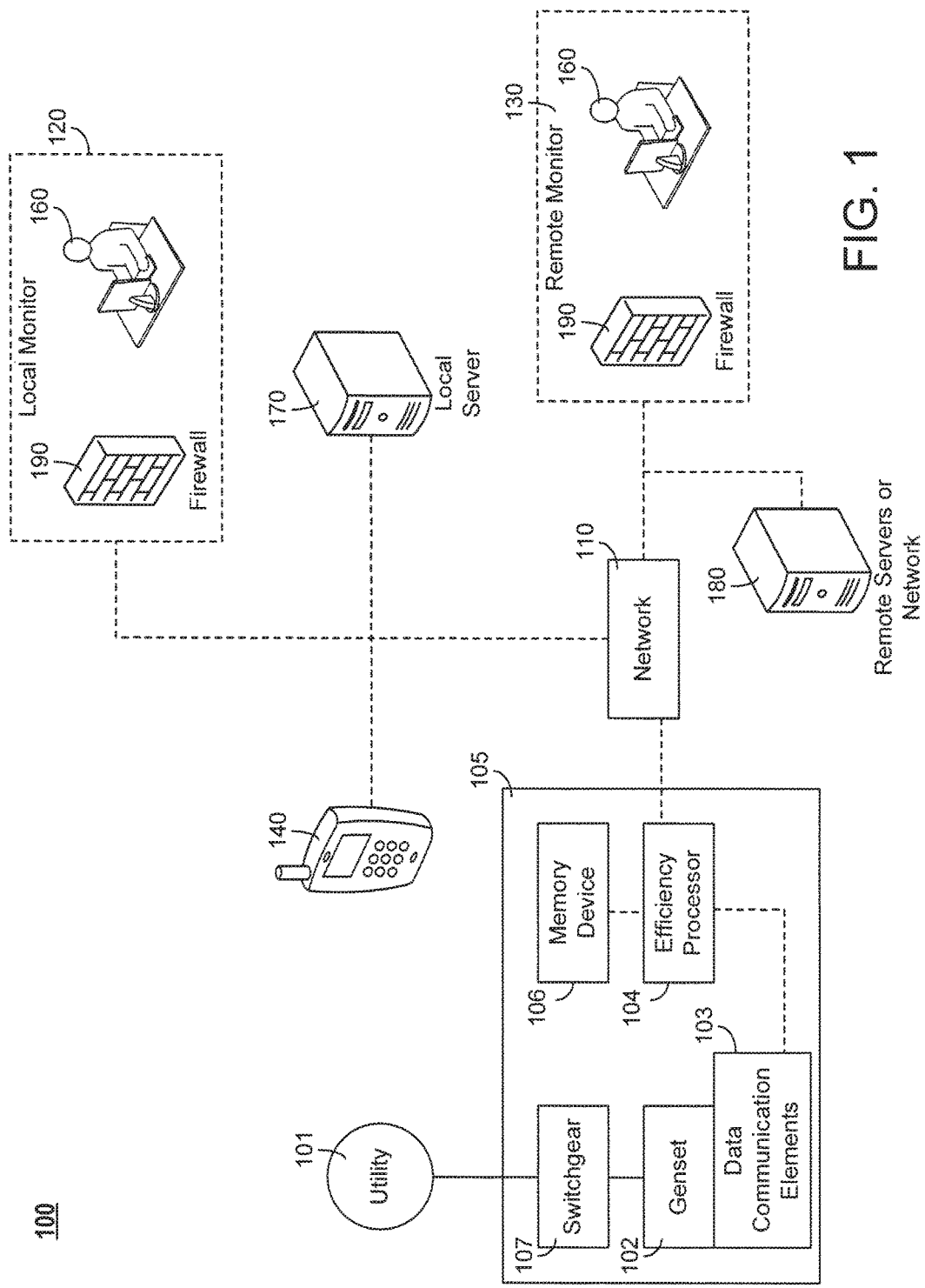
FIG. 1 is a schematic diagram of a monitoring system for a power generator according to an example embodiment.

Referring to the figures generally, the various embodiments herein relate to systems, apparatuses, and methods of early fault detection of a power generator using estimated engine efficiency. In some circumstances, components of power generators may experience aggravating conditions that cause the components to fail or potentially fail sooner than normally anticipated and outside of normal or predictive maintenance schedules. In many such cases the sensors and control systems of the power generator are unable to sense the failure directly, given the limited number of sensors and ability of the controls to infer a particular failure type from the sensed data, leading to a sensing gap or lack of sensing coverage on the power generator. When such failures and potential failures go unnoticed, power generation efficiency is affected and overall maintenance, fuel costs, and total ownership costs of the power generator are typically increased. Thus, it is prudent to monitor the power generator for operating conditions that depart from the anticipated normal.

As described herein, systems, apparatuses, and methods are provided that determine an estimated engine efficiency or an estimated engine efficiency value of the power generator that can be used to trend and analyze changes in engine efficiency over the life cycle of the power generator. When the estimated engine efficiency trend indicates a significant change in engine efficiency, the estimated engine efficiency value can be used to diagnose fault or failure conditions within the power generator and facilitate early preemptive repair. Examples of fault or failure conditions identifiable through such engine efficiency monitoring include after-treatment plugging, ignition, fueling, injection, or throttling problems, loss of compression efficiency, piston or ring degradation, valve or seat failure, head gasket failure, and other on-engine component degradation. These or other failures may result in loss in engine cylinder pumping efficiency or fuel combustion efficiency, potentially causing the power generated per unit of fuel input to fall. Alternatively, aftertreatment system and, thereby emissions may go out of specification, such that the power generator emits more pollutants per unit of energy generated, clogs or damages the after treatment system, or consumes more of an after treatment reactant (such as urea, ammonia, or diesel emission fluid (DEF)). Additional follow-on damage may also result from failing engine components, such as, but not limited to, damage to pistons, valves, turbochargers, or increases in heat load on the engine, cooling system, or loss of oil lubricity. In addition, the power generator may have its ability to respond to load increases or sudden transients negatively affected if the effective power/torque curve of the engine has been affected by the latent component failure or loss in cylinder efficiency. What constitutes a significant change in engine efficiency will depend on the normal operating characteristics or application of a particular power generation system, but, for example, a significant change may be defined as an engine efficiency that over time becomes above or below a specified normal range, or a sudden prolonged reduction in engine efficiency, or a period of sporadic change in engine efficiency. The estimated engine efficiency may be monitored continuously or at specified intervals. Accordingly, observation of significant changes in efficiency can lead to diagnosis and preemptive early repair of fault conditions within a genset system, reducing overall maintenance costs and total cost of ownership of the genset system. By analyzing the estimated engine efficiency trends, the customer or attendant may realize a greater amount of cost-savings events, such as inexpensive preventative maintenance opportunities, or delaying maintenance or overhaul until needed as indicated by the actual measured engine efficiency. As a result, manufacturers may attract additional customers due to this cost-savings benefit.

Referring to FIG. 1, a monitoring system 100 for a power generator is shown according to an example embodiment. The monitoring system 100 includes a network 110, a local monitor 120, a remote monitor 130, a distributor 140, and a power generator system 105. As shown, the power generator system 105 includes a power generator 102 coupled to data communication elements 103 (also referred to herein as "the communication circuit") and an efficiency processor 104. As described more fully herein, the efficiency processor 104 (also referred to herein as "the processing circuit") receives data regarding the power generator 102 from one or more data communication elements 103. The efficiency processor 104 uses the data to determine the engine efficiency of the power generator 102, for example via determining an estimated engine efficiency value of the power generator 102. The estimated engine efficiency value may comprise a volumetric efficiency, a thermal efficiency, a power generation efficiency of the power generator, an engine cylinder pumping efficiency, a fuel combustion efficiency or any combination thereof. Furthermore, the estimated engine efficiency value may be an actual measurement (e.g., measured via one or more sensors) or a theoretical value determined from a variety of efficiency parameters which are directly or indirectly representative of the engine efficiency value (e.g., a power generation efficiency value, an engine cylinder pumping efficiency value and/or a fuel combusting efficiency value). In some embodiments, the estimated engine efficiency value may include a ratio of an actual performance value to an ideal performance value of the power generator (e.g., ratio of actual power generated by the power generator to an ideal power of the power generator, etc.) expressed as a dimensionless number or percentage. In some embodiments, the estimated engine efficiency value may be obtained by dividing the equivalent British thermal unit (Btu) content of a kilowatt-hour (kWh) of electricity produced by the power generator 102 by a heat rate of the power generator 102 (i.e. an amount of energy used by the power generator 102 to generate one kWh of electricity). In some embodiments, the heat rate of the power generator may be used as the estimated engine efficiency value having units of Btu/kWh. In particular embodiments, the estimated engine efficiency value may be in the range of 25% to 70% inclusive of all ranges and values therebetween.

The engine efficiency is then provided over the network 110 (also referred to herein as "the diagnostic circuit") to at least one of a local monitor 120, a remote monitor 130, and a distributor 140. The engine efficiency is utilized in predictive service and advanced diagnostic algorithms to trend and analyze changes in the engine efficiency over time. In some embodiments, the efficiency processor 104 may also provide an alert or notification regarding predictive service or maintenance required for the power generator 102. The alert or notification may be provided to at least one of a local monitor 120, a remote monitor 130, and a distributor 140.

The efficiency processor 104 may be implemented as a general-purpose processor, an application specific integrated circuit (ASIC), one or more field programmable gate arrays (FPGAs), a digital signal processor (DSP), a group of processing components, or other suitable electronic processing components. The efficiency processor 104 may also include one or more memory devices 106. The one or more memory devices 106 (e.g., RAM, ROM, Flash Memory, hard disk storage, etc.) may store data and/or computer code for facilitating the various processes described herein. Thus, the one or more memory devices 106 may be communicably connected to the efficiency processor 104 and provide computer code or instructions to the efficiency processor 104 for executing the processes described in regard to the efficiency processor 104 herein. Moreover, the one or more memory devices 106 may include tangible, non-transient volatile memory or non-volatile memory. Accordingly, the one or more memory devices 106 may include database components, object code components, script components, or any other type of information structure for supporting the various activities and information structures described herein.

The network 110 enables the exchange of data, information, signals, and the like throughout the system 100. The network 110 includes any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. The network 110 may also include any number of intermediary networking devices, such as routers, switches, servers, etc. Accordingly, the network 110 may enable the efficiency processor 104 to provide at least one of an alert and an estimated engine efficiency value to at least one of a local monitor 120, a remote monitor 130, and a distributor 140.

The local monitor 120 refers to an on-site monitoring unit for the power generator system 105 whereas the remote monitor 130 refers to an off-site monitoring unit. The term "on-site" indicates that the local monitor is located in the same building, vicinity, location, etc. as the power generator system 105, and may be a hardware component or combination of hardware components of the power generator system 105 itself. The term "off-site" indicates the remote monitor is at a different location than the location of the power generator system 105. The monitors 120 and 130 may include one or more human-machine interfaces, such as a desktop computer, a mobile device such as a smartphone or mobile phone, a laptop computer, a tablet computer, and the like, whereby the human-machine interface allows for the exchange of information and data between an attendant 160 and the power generator system 105. Accordingly, the monitors 120 and 130 may receive and provide the estimated engine efficiency value and/or an alert or notification from the efficiency processor 104 to an attendant 160. In some embodiments, the local monitor 120, remote monitor 130, and distributor 140 may display the estimated engine efficiency value graphically as a function of time. Additionally, the monitors 120 and 130 may be supported by one or more servers (e.g., a local server 170 and a remote server 180) with firewalls 190. The firewalls 190 may isolate the monitors 120 and 130 to ensure or substantially ensure a secure file, data, and information exchange with the monitors 120 and 130 and the distributor 140. The distributor 140 represents any parts distributor and/or technician for the power generator 102. The distributor 140 may be embodied as a human-machine interface, like the monitors 120 and 130 described above.

Referring generally to FIG. 1, FIG. 1 depicts a utility application of the power generator 102 (also referred to herein as "genset 102"). The power generator 102 may include an engine and an alternator. In this embodiment, the power generator 102 may provide power through the switchgear 107 to the utility 101. The utility 101 includes any power plant that transmits the electricity generated by the power generator 102. The transmission destination includes residential areas (e.g., homes) and/or commercial areas (e.g., manufacturing plants). The switchgear 107 serves as an intermediary between the power generator 102 and the utility 101 to control the flow of electricity from the power generator 102 to the utility 101. Accordingly, the switchgear 107 may include a variety of switches, breakers, fuses, and control systems.

The efficiency processor 104 uses an alternator electrical parameter, for example and alternator output power parameter and a fuel flow input measurement to determine the engine efficiency of the power generator 102. The fuel flow input measurement may include an engine operation measurement, an engine diagnostic measurement, and/or a fuel flow rate. In some embodiments, the engine diagnostic measurement may comprise of an injector timing, a fuel pressure measurement, a spark ignition timing, a liquid fuel flow rate, a fuel gas mass flow rate measurement, an exhaust gas temperature measurement, an exhaust gas oxygen level, an engine coolant temperature, an exhaust gas nitrous oxide measurement, an exhaust gas NOx measurement (e.g., nitric oxide, nitric oxide, nitrogen dioxide, etc.), an intake air temperature, an intake air pressure, or an intake air mass flow measurement. In one embodiment, real power output of the alternator is measured. Other embodiments may include, but are not limited to, one or more measurements of kVA, voltage, real power, reactive power, apparent power, power factor, winding temperatures, or amperage output of the alternator. This alternator output may in some embodiments be adjusted by the alternator efficiency, either as a static average number or based on an efficiency-load output curve to get a more accurate measure of power conversion and engine output of the power generator. Engine efficiency is then tracked by comparing fuel input versus alternator output power, either instantaneously or as a time-based trend which may be used to determine the estimated engine efficiency value. The estimated engine efficiency value can then be utilized in predictive service and/or advanced diagnostic algorithms to trend and analyze changes in engine efficiency over the life cycle of the power generator 102. Observation of significant changes in engine efficiency can lead to fault and/or failure diagnosis and preemptive early repair, saving overall maintenance costs and enhancing system total cost of ownership.

Because the power generator 102 may be implemented in a variety of settings, the power generator 102 may include a variety of different types and sizes. The power generator 102 may include a genset, a traditional synchronous electric generator, a variable speed genset, a cogeneration device (e.g., a combined heat and power generator, or CHP), and/or a trigeneration device (e.g., a combined heat, cooling, and power generator). The efficiency processor 104 may determine the estimated engine efficiency value of any of these types of power generators 102. In the case of a combined heat and power or trigeneration power generator, the energy output inherent in the thermal heating or cooling being provided may further be estimated and utilized as an input to the engine efficiency measure. In one embodiment, this estimation of thermal output is accomplished using the temperature differential of the coolant input temperature into the engine versus output temperature from the engine and the coolant flow rate. This thermal energy output from the engine is then converted and added to the mechanical energy output measured by the electrical energy output. The power generator 102 includes an internal combustion engine powered by a variety of fuels (e.g., gasoline, diesel, natural gas, etc.). Each engine may include a plurality of engine cylinders, and each of these cylinders may be individually monitored by data communication elements 103. Thus, in addition to determining overall engine efficiency, the efficiency processor 104 may determine the estimated engine efficiency value of one or a plurality of engine cylinders within the power generator 102. The efficiency of the individual engine cylinders can also be used to facilitate failure diagnosis and preemptive repair in various embodiments. Examples of fault or failure conditions identifiable through such engine cylinder efficiency monitoring include injector plugging, spark plug degradation, loss of compression efficiency, and fault prevention mechanisms (intentional combustion shutdown of a failing cylinder through cutting off fuel supply, ignition disabling or timing changes, or intake or exhaust valve opening or timing changes). Moreover, although depicting a single power generator 102, the power generation system 105 may include a plurality of power generators 102 of one or more types (e.g., a cogeneration and a trigeneration device) that are communicatively coupled with the efficiency processor 104. As such, the efficiency processor 104 may determine the engine efficiency of a plurality of power generators 102, or the engine efficiency of a plurality of engine cylinders within a plurality of power generators 102. In one embodiment, the fueling and/or ignition timing or injection timing of individual engine cylinders can be altered or modulated and tracked versus changes in overall engine fueling/throttling commands and alternator output to determine the power contribution, relative health, and efficiency of individual cylinders or differentially diagnose different possible failure modes of the engine. For example, ignition timing may be advanced or retarded on a cylinder to determine knock levels and indicate overall relative cylinder pressure levels, fuel injection timing can be advanced or retarded or changed in amount to aide in diagnosing valve issues, turbo function, or after treatment problems. In yet another embodiment, the variable valve timing control of a variable valve engine is also altered to identify and estimate overall engine condition, cylinder wear levels, and/or potential failure conditions. In yet a further embodiment, individual cylinder modulation and power generator output monitoring is utilized to provide an ongoing engine tuning or individual cylinder tuning process to maximize engine efficiency, combustion, and minimize emission output.

The data communication elements 103 may include sensor or sensorless components, and may transmit the data by any wired and/or wireless protocol, like that mentioned above, to the efficiency processor 104. While the efficiency processor 104 may be a separate unit from the power generator 102 (and the switchgear 107) as shown in FIG. 1, the efficiency processor 104 may also be a part of the power generator 102 (e.g., integrated into a control system of power generator 102).

In certain embodiments, the efficiency processor 104 includes one or more modules structured to functionally execute the operations of the efficiency processor 104 for early fault detection of a power generator. Thus, the efficiency processor 104 typically comprises one or more communication modules for receiving the alternator output power and the fuel flow input measurement, a processing module for determining the estimated fuel efficiency of the power generator in response to the alternator output power parameter and the fuel flow input measurement, and a diagnostic module for transmitting the estimated engine efficiency value to a monitoring device.

Figure 2:
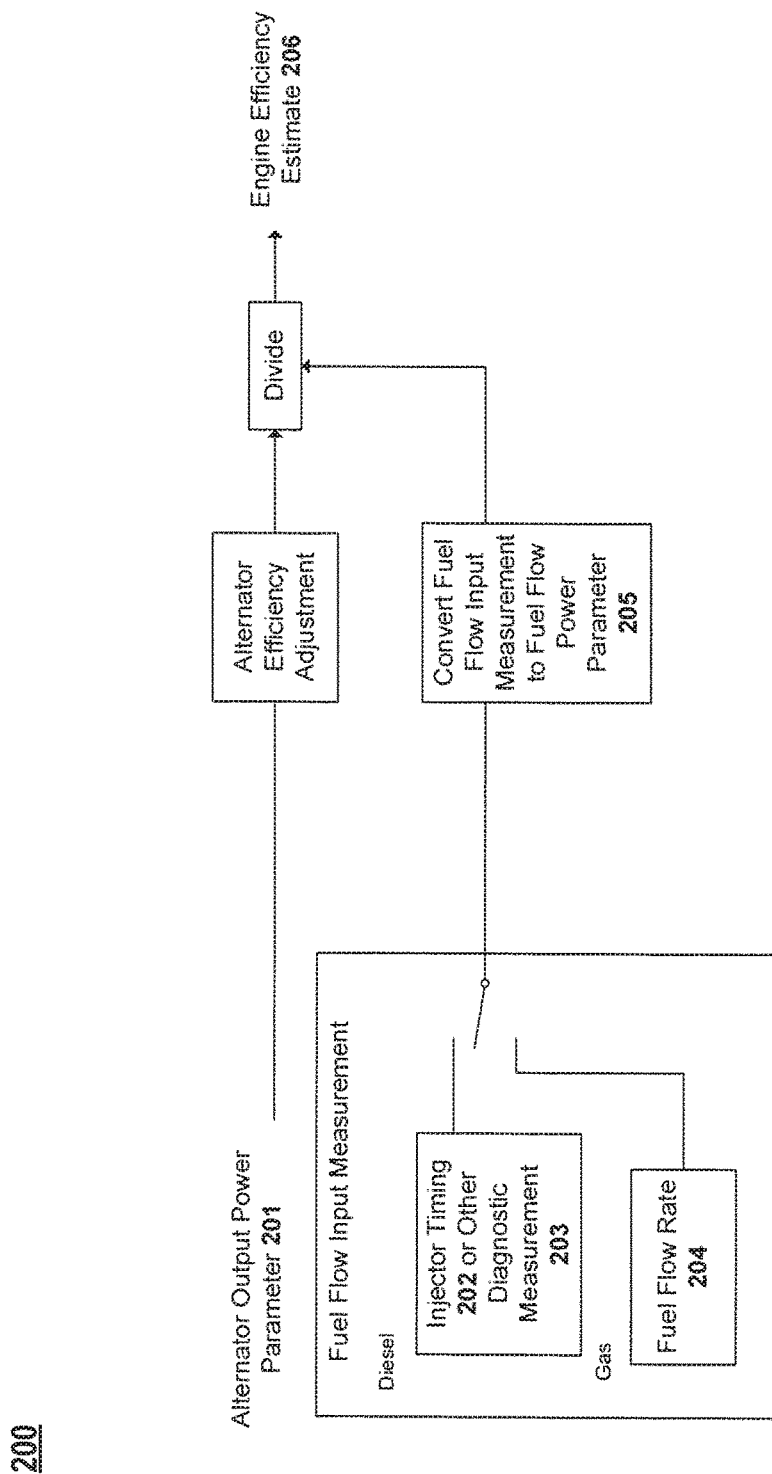
FIG. 2 is a diagram depicting a determination of an estimated engine efficiency value using an alternator output power parameter and a fuel flow input parameters according to an example embodiment.

FIG. 2 is a diagram depicting a determination of an estimated engine efficiency or an estimated engine efficiency value using an alternator power parameter and a fuel flow fuel flow input measurement according to an example embodiment. In the process 200, an alternator output power parameter 201 is received by the efficiency processor/controller 104. The alternator output power parameter 201 is a measurement of the alternator output power. In one embodiment, the alternator output power parameter 201 is adjusted by the efficiency processor 104 to account for the efficiency of the alternator in order to obtain a more accurate engine efficiency and power estimate. A fuel flow input measurement is also received by the efficiency processor 104. The fuel flow input measurement may be based upon at least one of an injector timing 202, another diagnostic measurement 203, or a fuel flow rate 204. In diesel-powered engines, the fuel flow input parameter is the real-time injector timing or other diagnostic measurement. The other diagnostic measurement 203 may be a J1939 message, an SAE communication and diagnostics standard for commercial vehicles. Injector timing may be referenced in terms of liquid fuel, whereas gas mass flow may be referenced in terms of gaseous fuels. In gas-powered engines, the fuel flow input measurement is the fuel flow rate 204. The engine efficiency estimate 206 is determined by dividing the alternator output power parameter 201 by the fuel flow power parameter. In one embodiment, the fuel flow input measurement is converted to a fuel flow power parameter at 205 in order to account for the energy density of the fuel. For liquid fuels, the fuel flow power parameter may be determined using a lookup table of injector duty cycle and volumetric flow rate values. For gaseous fuels, the fuel flow power parameter may be determined based on the fuel's mass energy density. In various natural gas, syn-gas, or bio-gas gaseous fuel embodiments a fuel quality or energy content sensor may be used to alter the fuel flow input measurement for appropriate input energy content. The engine efficiency estimate 206 may then be determined by dividing the alternator output power parameter 201 by the fuel flow power parameter. The energy density conversion permits the engine efficiency estimate 206 to account for variations in fuel temperature, pressure, and quality.

Figure 3:
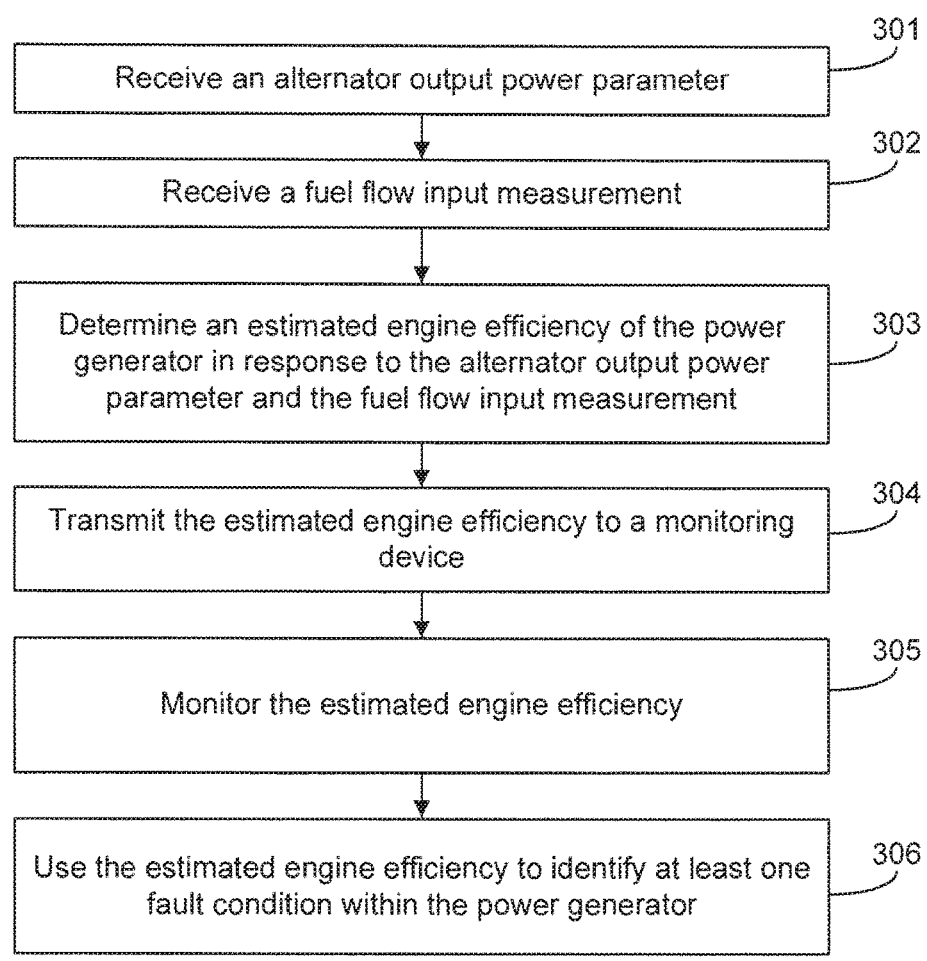
FIG. 3 is a flow diagram of a method using an estimated engine efficiency value in predictive maintenance of a power generator according to an example embodiment.

FIG. 3 is a flow diagram of a method of using estimated engine efficiency (i.e., an estimated engine efficiency value) in predictive maintenance of a power generator according to an example embodiment. The process 300 can be implemented, for example, on a computing device. In one implementation, the process 300 is encoded on a computer-readable medium that contains instructions that, when executed by a computing device, cause the computing device to perform operations of the process 300.

The process 300 depicted in FIG. 3 includes, at 301, receiving an alternator output parameters. Parameters include at least one or more of real power, apparent power, power factor, winding temperatures, kVA output, voltage output, reactive power, or amperage output of the alternator. At 302, a fuel flow input measurement is received. At 303, the estimated engine efficiency is determined in response to the alternator power output parameter and the fuel flow input measurement. At 304, the estimated engine efficiency is transmitted to a monitoring device. At 305, the estimated engine efficiency is monitored. In a particular embodiment, this monitoring occurs over the life cycle of the power generator, although the monitoring can occur over other periods as well. At 306, the estimated engine efficiency is used to identify at least one fault condition within the power generator.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

In general, the routines executed to implement the embodiments may be implemented as part of an operating system or a specific application, module, or sequence of instructions. As described above, the efficiency processor 104, in certain embodiments, forms a processing system or subsystem that includes one or more computing devices having memory, processing, and communication hardware. The processor may be a single device or a distributed device, and the functions of the processor may be performed by hardware and/or as computer instructions on a non-transient computer (or machine) readable storage medium. Such computer-readable media can be any available media that can be accessed by a general purpose or special purpose computer or other machine with a processor. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. In certain embodiments, the processor includes one or more modules structured to functionally execute the operations of the efficiency processor. The description herein including the components of the efficiency processor emphasizes the structural independence of the aspects of the processor, and illustrates one grouping of operations and responsibilities of the processor. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors (e.g., data communication elements 103) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The term "network" includes all kinds of agent, devices, and machines for processing data, including by way of example a programmable processor, a computer, a system on a chip, or multiple ones, or combinations, of the foregoing. The agent can include special purpose logic circuitry, e.g., an FPGA (field programmable gate array) or an ASIC (application-specific integrated circuit). The agent can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The agent and execution environment can realize various different computing model infrastructures, such as web services, distributed computing and grid computing infrastructures. When information is transferred or provided over a network (e.g., FIG. 1) or another communications connection (either hardwired, wireless, or a combination of hardwired or wireless) to a machine, the machine properly views the connection as a computer (or machine) readable medium, like that described above. Thus, any such connection is properly termed a computer-readable medium.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of early fault detection of a power generator, the method comprising:
   receiving alternator electrical parameters;
   receiving fuel flow input measurements;
   determining an estimated engine efficiency value of the power generator in response to the alternator electrical parameters and the fuel flow input measurements; and
   adjusting an engine tuning process in response to the estimated engine efficiency value of the power generator.

2. The method of claim 1, further comprising adjusting the alternator electrical parameters to account for an estimated efficiency of the alternator.

3. The method of claim 1, wherein the alternator electrical parameters are alternator output power parameters.

4. The method of claim 1, wherein the estimated engine efficiency value is monitored over a life cycle of the power generator.

5. The method of claim 1, further comprising adjusting the fuel flow input measurement to account for energy input for at least one of a flow rate, an energy density of the fuel, a fuel sub-component make up, an ambient temperature, an intake air flow rate, an ambient air pressure, an air intake restriction, an air filter restriction, and an exhaust restriction.

6. The method of claim 1, further comprising using the estimated engine efficiency value to identify at least one fault condition within the power generator.

7. The method of claim 6, further comprising using the estimated engine efficiency value and the engine operating parameters to identify at least one of a maintenance condition, a failing part, a component wear estimation, a fault condition, a tuning need, a fuel quality condition, or an environmental condition of the power generator.

8. The method of claim 1, further comprising transmitting an alert indicating the existence of a fault condition within the power generator to a monitoring device.

9. The method of claim 1, further comprising transmitting an alert indicating the existence of a maintenance condition within the power generator to a monitoring device.

10. The method of claim 1, further comprising transmitting the estimated engine efficiency value to a monitoring device.

11. The method of claim 3, wherein the alternator output power parameters and the fuel flow input measurements correspond to one or more engine cylinders.

12. A power generation system, comprising:
    a power generator; and
    a processor configured to:
      receive an alternator output power parameter of an alternator of the power generator;
      receive a fuel flow input measurement of a fuel provided to the power generator;

determine an estimated engine efficiency value of the power generator in response to the alternator output power parameter and the fuel flow input measurement; and adjust an engine tuning process in response to the estimated engine efficiency value of the power generator.

13. The power generation system of claim 12, wherein the processor is further configured to adjust the alternator output power parameter to account for an estimated efficiency of the alternator.

14. The power generation system of claim 12, wherein the fuel flow input measurement comprises at least one of a diagnostic measurement and a fuel flow rate.

15. The power generation system of claim 12, wherein the processor is further configured to adjust the fuel flow input measurement to account for an energy density of the fuel.

16. The power generation system of claim 14, wherein the diagnostic measurement comprises at least one of an injector timing, a fuel quality measurement, an energy density measurement, a gas component measurement, or a gas mass flow measurement.

17. The power generation system of claim 12, wherein the processor is further configured to identify at least one fault condition within the power generator using the estimated engine efficiency value.

18. The power generation system of claim 12, wherein the processor is further configured to transmit to a monitoring device at least one of the estimated engine efficiency value, an alert signaling the existence of a maintenance condition, or an alert signaling the existence of a fault condition within the power generator.

19. An apparatus for early fault detection of a power generator, the apparatus comprising:

a communication circuit for receiving alternator output power parameters and fuel input measurement parameters; and a processing circuit for determining an estimated engine efficiency value of the power generator in response to the alternator output power parameter and the fuel input measurement, the processing circuit configured to adjust an engine tuning process in response to the estimated engine efficiency value of the power generator.

20. The apparatus of claim 19, wherein the power generator comprises an alternator, and wherein the processing circuit is further configured to adjust the alternator output power parameter by a conversion factor to account for an estimated efficiency of an alternator.

21. The apparatus of claim 19, wherein the fuel flow input measurement comprises at least one of an engine operation measurement, an engine diagnostic measurement, and a fuel flow rate.

22. The apparatus of claim 21, wherein the engine diagnostic measurement comprises at least one of an injector timing, a fuel pressure measurement, a spark ignition timing, a liquid fuel flow rate, a fuel gas mass flow rate measurement, an exhaust gas temperature measurement, an exhaust gas oxygen level, an engine coolant temperature, an exhaust gas nitrous oxide measurement, an exhaust gas NOx measurement, an intake air temperature, an intake air pressure, or an intake air mass flow measurement.

23. The apparatus of claim 19, wherein the processing circuit is further configured to adjust the fuel flow input measurement to account for at least one of a fuel flow rate, a measured fuel component make up, a cetane measurement, an octane measurement, a methane number measurement, an ethane measurement, a propane measurement, and an energy density of the fuel.

24. The apparatus of claim 19, wherein the processing circuit is further configured to identify at least one fault condition within the power generator using the estimated engine efficiency value.

25. The apparatus of claim 19, further comprising a diagnostic circuit configured to transmit to a monitoring device at least one of the estimated engine efficiency value of the power generator, an alert signaling the existence of a fault condition within the power generator, and an alert signaling the existence of a maintenance condition of the power generator.

* * * * *